United States Patent
Seok et al.

(10) Patent No.: US 8,599,696 B2
(45) Date of Patent: Dec. 3, 2013

(54) METHOD OF PROCESSING ADAPTIVE HYBRID AUTOMATIC REPEAT REQUEST (HARQ) SCHEME BY SELECTING A START POINT OF DATA BLOCK IN A MOTHER CODE

(75) Inventors: Ji Ae Seok, Anyang-si (KR); Wook Bong Lee, Anyang-si (KR); Woo Suk Kwon, Anyang-si (KR); Suk Woo Lee, Anyang-si (KR); Jong Min Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 513 days.

(21) Appl. No.: 12/811,610

(22) PCT Filed: Dec. 31, 2008

(86) PCT No.: PCT/KR2008/007856
§ 371 (c)(1),
(2), (4) Date: Jul. 2, 2010

(87) PCT Pub. No.: WO2009/084913
PCT Pub. Date: Jul. 9, 2009

(65) Prior Publication Data
US 2010/0290438 A1 Nov. 18, 2010

(30) Foreign Application Priority Data
Jan. 3, 2008 (KR) .................. 10-2008-0000727

(51) Int. Cl.
*H04L 1/00* (2006.01)
(52) U.S. Cl.
USPC ........... 370/236; 370/335; 370/338; 714/748; 714/749; 714/750
(58) Field of Classification Search
None
See application file for complete search history.

(56) References Cited

U.S. PATENT DOCUMENTS

| | | | |
|---|---|---|---|
| 6,615,382 B1 | 9/2003 | Kang et al. | |
| 7,283,509 B2 | 10/2007 | Moon et al. | |
| 2003/0039229 A1* | 2/2003 | Ostman | 370/335 |
| 2003/0097629 A1* | 5/2003 | Moon et al. | 714/751 |
| 2003/0147474 A1* | 8/2003 | Ha et al. | 375/295 |
| 2003/0217319 A1* | 11/2003 | Tripathi et al. | 714/751 |
| 2007/0109956 A1* | 5/2007 | Kwon et al. | 370/208 |

OTHER PUBLICATIONS

Arnab Das et al., "Adaptive, Asynchronous Incremental Redunancy (A2IR) With Fixed Transmission Time Intervals (TTI) For HSDPA", The 13th International IEEE Sympoium on PIMRC, vol. 3, Sep. 15-18, 2002, pp. 1083-1087.
Jung-Fu (Thomas) Cheng, "On The Coding Gain Of Incremental Redundancy Over Chase Combing", In IEEE On Global Telecommunications Conference, vol. 1, Dec. 1-5, 2003, pp. 107-112.

* cited by examiner

*Primary Examiner* — Ian N Moore
*Assistant Examiner* — Tito Pham
(74) *Attorney, Agent, or Firm* — Birch, Stewart, Kolasch & Birch, LLP (57) ABSTRACT

A method of transmitting data using HARQ includes transmitting a first block, a partial bit stream of a codeword, and transmitting a second block, a bit stream starting from a bit index next to the last bit index of the first block, according to a retransmission request with respect to the codeword, wherein a different modulation scheme from that of the first block is applied to the second block. A coding gain of an incremental redundancy (IR) mode can be obtained although the amount of retransmission data is arbitrarily changed according to a change in transmission attributes such as a modulation scheme, resource allocation, the size of a transport block, or the like, in the adaptive HARQ scheme, so the transmission efficiency of a system can be enhanced.

3 Claims, 6 Drawing Sheets

METHOD OF PROCESSING ADAPTIVE HYBRID AUTOMATIC REPEAT REQUEST (HARQ) SCHEME BY SELECTING A START POINT OF DATA BLOCK IN A MOTHER CODE

TECHNICAL FIELD

The present invention relates to wireless communications and, more particularly, to a method of transmitting data using HARQ.

BACKGROUND ART

IEEE (Institute of Electrical and Electronics Engineers) 802.16 standards provide techniques and protocols to support a broadband wireless access. Standardization proceeded starting from 1999 and IEEE 802.16-2001 was approved in 2001. It is based on a single carrier physical layer called 'WirelessMAN-SC'. Later, besides the 'WirelessMAN-SC', 'WirelessMAN-OFDM' and 'WirelessMAN-OFDMA' were added to the physical layer in IEEE 802.16a standards approved in 2003. After the IEEE 802.16a standards were completed, revised IEEE 802.16-2004 standards were approved in 2004. IEEE 802.16-2004/Cor1 (referred to as 'IEEE 802.16e' hereinafter) was finalized in the form of 'corrigendum' in 2005 in order to resolve and correct bugs and errors of the IEEE 802.16-2004 standards.

An error correction scheme for securing the reliability of communications includes a forward error correction (FEC) scheme and an automatic repeat request (ARQ) scheme. In the FEC scheme, an extra error correction code is added to information bits to correct an error in a receiving end. In the ARQ scheme, an error is corrected through data retransmission, and the ARQ scheme includes a stop and wait (SAW) scheme, a go-back-N (GBN) scheme, a selective repeat (SR) scheme, or the like. The SAW scheme is a scheme in which it is checked whether or not a transmitted frame has been properly received and then a next frame is transmitted. The GBN scheme is a scheme in which the N number of successive frames are transmitted, and if the transmission is not successfully made, all the frames, which were transmitted following a frame with an error, are retransmitted. The SR scheme is a scheme for selectively retransmitting only frame with an error.

The FEC scheme is advantageous in that a time delay is small and there is no need to transmit or receive information between a transmitting end and the receiving end, but it has shortcomings that a system efficiency deteriorates in a good channel environment. The ARQ scheme ensures a high transmission reliability but is disadvantageous in that time delay occurs and the system efficiency deteriorates in a bad channel environment. A hybrid automatic repeat request (HARQ) scheme combining the FEC and the ARQ has been proposed to resolve such drawbacks. According to the HARQ scheme, it is checked whether data received by a physical layer has an error that cannot be decoded, and if the data has an error, the data is requested to be retransmitted to thereby enhance performance.

A mode of the HARQ may be divided into a chase combining (CC) mode and an incremental redundancy (IR) mode. The CC mode is to obtain a signal-to-noise ratio (SNR) gain by combining an error-detected data with retransmitted data, rather than discarding the error-detected data. The IR mode is to incrementally transmit additional redundant information of retransmitted data to thereby reduce a burden of retransmission and obtain a coding gain.

If no error is detected from received data, a receiver transmits an acknowledgement (ACK) signal as a response signal to inform a transmitter about the successful reception. If an error is detected from received data, the receiver transmits a negative-acknowledgement (NACK) signal as a response signal to inform the transmitter about the error detection. Upon receiving the NACK signal, the transmitter may retransmit data.

The receiver of the HARQ scheme basically attempts an error correction on the received data and determines whether to retransmit data by using an error detection code. As the error detection code, a cyclic redundancy check (CRC) may be used. When an error of reception data is detected through the CRC detection process, the receiver transmits the NACK signal to the transmitter. Upon receiving the NACK signal, the transmitter transmits proper retransmission data according to the HARQ mode (CC mode or IR mode). Upon receiving the retransmission data, the receiver combines the previous data and the retransmission data and decodes the same, thereby improving reception performance.

The retransmission scheme of the HARQ may be classified into a synchronous scheme and an asynchronous scheme. In the synchronous HARQ, data is retransmitted at a point of time both the transmitter and the receiver knows about, and signaling required for transmission of data such as HARQ processor number or the like can be reduced. In the asynchronous HARQ, resources are allocated at an arbitrary time for retransmission. Because signaling is required for data transmission, overhead is generated.

The HARQ may be classified into an adaptive HARQ and a non-adaptive HARQ according to transmission attributes such as a resource allocation, modulation scheme, size of a transport block, or the like. The adaptive HARQ is a scheme in which the transmission attributes used for retransmission are compared with a first transmission, and entirely or partially changed and transmitted according to a change in a channel state. The non-adaptive HARQ is a scheme in which the transmission attributes used for a first transmission are continuously used regardless of a change in a channel state.

When data is retransmitted in the IR mode, additional redundant information should be incrementally transmitted, but in case of the adaptive HARQ scheme in which transmission attributes are changed, the modulation scheme, the size of a transport block, or the like, vary, so the retransmission data cannot be incrementally transmitted and the coding gain of the IR mode cannot be obtained.

Thus, a method for obtaining the gain of the IR mode although the amount of retransmission data is arbitrarily changed due to a change in the modulation scheme, resource allocation, or the like, in the adaptive HARQ scheme is required.

DISCLOSURE OF INVENTION

Technical Problem

Therefore, an object of the present invention is to provide a method for transmitting data using an adaptive HARQ.

Technical Solution

In an aspect, a method for transmitting data using HARQ includes transmitting a first block, a partial bit stream of a codeword, and transmitting a second block, a bit stream starting from a bit index next to the last bit index of the first block, according to a retransmission request with respect to the codeword, wherein a different modulation scheme from that of the first block is applied to the second block.

In another aspect, a method of transmitting data using HARQ includes transmitting first data, and transmitting second data according to a retransmission request with respect to the first data, wherein a different modulation scheme from that of the first data is applied to the second data, and the second data includes a bit stream subsequent to a bit stream of the first data.

Advantageous Effects

The coding gain of the IR mode can be obtained although the amount of retransmission data is arbitrarily changed according to a change in the transmission attributes such as a modulation scheme, resource allocation, the size of a transport block, or the like, in the adaptive HARQ scheme, so the transmission efficiency of the system can be enhanced.

MODE FOR THE INVENTION

Figure 1:
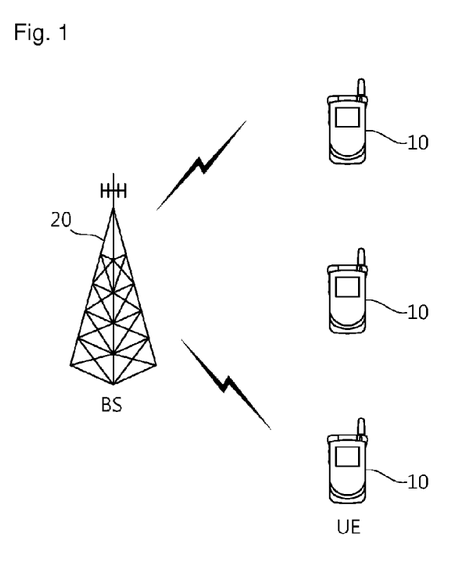
FIG. 1 shows a wireless communication system.

FIG. 1 shows a wireless communication system. The wireless communication system is widely deployed to provide a variety of communication services, such as voices, packet data, etc.

Referring to FIG. 1, the wireless communication system includes a base station (BS) 20 and user equipments (UEs)) 10. The UEs 10 may be fixed or have mobility, and may be referred to as another terminology, such as a mobile station (MS), a user terminal (UT), a subscriber station (SS), a wireless device, etc. The BS 20 generally refers to a fixed station that communicates with the UEs 10 and may be called another terminology, such as a node-B, a base transceiver system (BTS), an access point, etc. One or more cells may exist within the coverage of the BS 20.

Hereinafter, downlink refers to communication link from the BS 20 to the UEs 10, and uplink refers to communication link from the UEs 10 to the BS 20. In the downlink, a transmitter may be a part of the BS 20, and a receiver may be a part of the UEs 10. In the uplink, a transmitter may be a part of the UEs 10, and a receiver may be a part of the BS 20.

The wireless communication system may be an OFDM (Orthogonal Frequency Division Multiplexing)/OFDMA (Orthogonal Frequency Division Multiple Access)-based system. The OFDM uses orthogonality characteristics between IFFT (Inverse Fast Fourier Transform) and FFT (Fast Fourier Transform). The transmitter performs IFFT on data and transmits the same. The receiver performs FFT on received data to restore the original data. The transmitter uses IFFT to combine multiple subcarriers, and the receiver uses corresponding FFT to split the multiple subcarriers.

Figure 2:
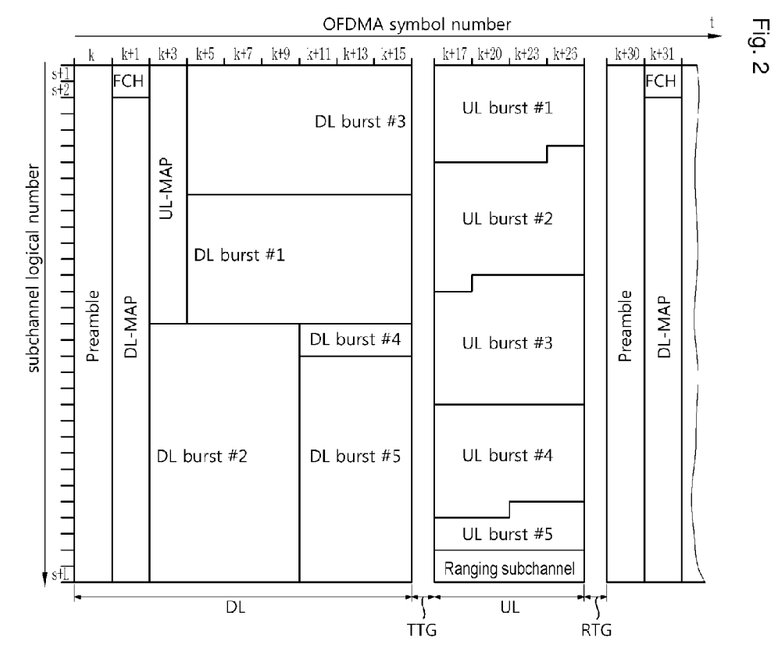
FIG. 2 is a block diagram showing an example of a frame structure.

FIG. 2 is a block diagram showing an example of a frame structure. The frame is a data sequence during a fixed time period used by physical specifications. It may refer to the paragraph 8.4.4.2 of "Part 16: Air Interface for Fixed Broadband Wireless Access Systems" of IEEE standards 802.16-2004 (referred to as 'Reference document 1', hereinafter).

With reference to FIG. 2, the frame includes a downlink (DL) frame and an uplink (UL) frame. Time division duplex (TDD) refers to a method in which uplink and downlink transmissions share the same frequency but occur at each different time. The downlink frame temporally goes ahead of the uplink frame. The downlink frame includes a preamble, a frame control header (FCH), a DL (Downlink)-MAP, a UL (Uplink)-MAP, burst regions, starting in this order. A guard time for discriminating the uplink frame and the downlink frame is inserted into a middle portion of the frame (i.e., between the downlink frame and the uplink frame), and to a final portion (after the uplink frame). A transmit/receive transition gap (TTG) refers to a gap between a downlink burst and a subsequent uplink burst. A receive/transmit transition gap (RTG) refers to a gap between the uplink burst and a subsequent downlink burst.

The preamble is used for initial synchronization between a base station and a UE, cell search, frequency offset, and channel estimation. The FCH includes the length of a DL-MAP message and coding information of the DL-MAP message.

The DL-MAP is a region on which the DL-MAP message is transmitted. The DL-MAP message defines an access of a downlink channel. The DL-MAP message includes a configuration change count of a DCD (Downlink Channel Descriptor) and a base station ID (Identifier). The DCD describes a downlink burst profile applied to a current map. The downlink burst profile refers to the characteristics of a downlink physical channel, and the DCD is periodically transmitted by the base station via a DCD message.

The UL-MAP is a region on which a UL-MAP message is transmitted. The UL-MAP message defines an access of an uplink channel. The UL-MAP message includes a configuration change count of a UCD (Uplink Channel Descriptor) and a valid start time of uplink allocation defined by the UL-MAP. The UCD describes an uplink burst profile. The uplink burst profile refers to the characteristics of an uplink physical channel, and the UCD is periodically transmitted by the base station via a UCD message.

Hereinafter, a slot is a minimum available data allocation unit and defined as time and a subchannel. The number of subchannels depends upon the size of FFT and time-frequency mapping. Subchannels include a plurality of subcarriers. The number of subcarriers per subchannel differs depending on permutations. Permutation refers to mapping of a logical subchannel to a physical subcarrier. In full usage of subchannels (FUSC), a subchannel includes 48 subcarriers, and in a partial usage of subchannels (PUSC), a subchannel includes 24 or 16 subcarriers. A segment refers to at least one subchannel set.

Data of a physical layer is mapped to a physical subcarrier through two steps. In a first step, data is mapped to at least one data slot in at least one logical subchannel. In a second step, each logical subchannel is mapped to physical subcarriers. This is called permutation. Reference document 1 discloses permutations such as FUSC, PUSC, O-FUSC (Optional-FUSC), O-PUSC (Optional-PUSC), AMC (Adaptive Modulation and Coding), or the like. A set of OFDM symbols using the same permutation is called a permutation zone, and a single frame includes at least one permutation zone.

The FUSC and the O-FUSC are used only for downlink transmission. The FUSC includes a single segment including every subchannel group. Each subchannel is mapped to a physical subcarrier distributed in the entire physical channels. This mapping changes for each OFDM symbol. A slot includes a single subchannel in a single OFDM symbol. The O-FUSC has a different pilot allocation method from that of the FUSC.

The PUSC is used for both downlink transmission and uplink transmission. In downlink, respective physical channels are divided into clusters each having 14 contiguous subcarriers in two OFDM symbols. The physical channels are mapped to six groups. In each group, pilot is allocated to each cluster and is in a fixed position. In the uplink, the subcarriers may be divided into tiles including four contiguous physical subcarriers on three OFDM symbols. Each subchannel includes six tiles. The O-PUSC is used only for uplink transmission, and each tile includes three continuous physical subcarriers on three OFDM symbols. Pilot is allocated to the center of tiles.

Figure 3:
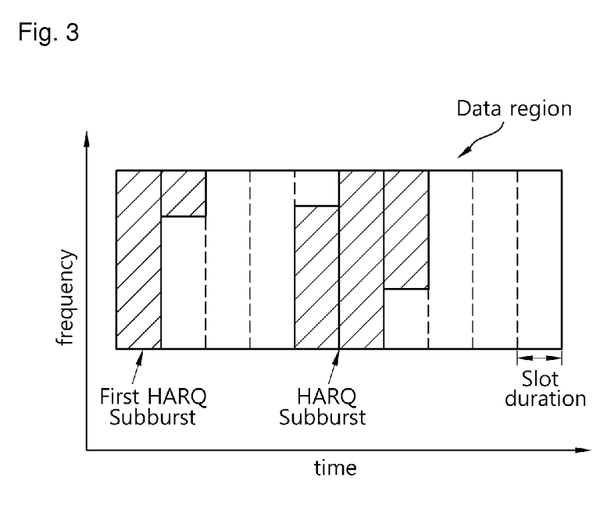
FIG. 3 shows a resource allocation structure for HARQ.

FIG. 3 shows a resource allocation structure for HARQ.

With reference to FIG. 3, a data region is a logical two-dimensional resource allocation region including at least one subchannel and at least one OFDM symbols. The data region may correspond to one burst in a frame. In a downlink transmission, information about the data region may be transmitted from the BS to the UE via an HARQ DL MAP message.

The data region is partitioned into at least one subburst according to an HARQ process with respect to each user. The HARQ process with respect to a single information block is performed in a single subburst. A single connection identifier (CID) may be allocated to a single subburst. The CID refers to a value for checking a connection of the BS and the UE in a medium access control (MAC). All the subburst belonging to a single data region are operated in the same HARQ mode (CC mode or IR mode).

Each subburst is allocated by slot, and slots may be allocated in the frequency-first order. Namely, slots are allocated, starting from one having the smallest OFDM symbol and the smallest subchannel, while increasing subchannels. The number of OFDM symbols are increased as long as a slot duration at the last subchannel.

A single burst is allocated to a data stream using the HARQ process operated in the same mode, and each burst is divided into a lower concept called a subburst by users (or CIDs).

Figure 4:
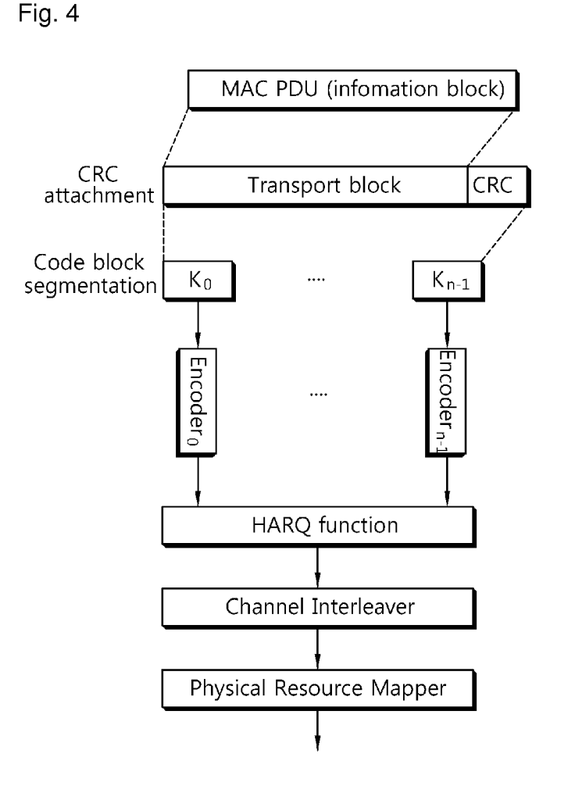
FIG. 4 shows processing of information blocks to perform HARQ.

FIG. 4 shows processing of information blocks to perform HARQ.

With reference to FIG. 4, the entirety or a portion of information blocks are sent to a transport block to be delivered to a physical layer, and a cyclic redundancy check (CRC), an error detection code, is attached to a single transport block (CRC attachment). The information block may be called a protocol data unit (PDU) of the MAC. When a layer that performs HARQ is a physical layer, the MAC PDU is a data unit delivered from the MAC layer, an upper layer, to the physical layer.

The CRC-attached transport block is segmented into a proper size for channel encoding (code block segmentation). The segmented block is called a code block. An encoder performs channel encoding on the code block and outputs coded bits. The encoder may apply a turbo code, one of error correction codes. The turbo code is a systematic code that includes information bits as systematic bits. In case of a turbo code having a code rate of 1/3, two parity bits are allocated to a single systematic bit. In this case, the error correction code is not limited to the turbo code, and the technical idea of the present invention can be also applicable as it is to a low density parity check code (LDPC code), a convolution code, or the like.

A single HARQ function is performed by transport blocks. The HARQ processor performs an HARQ mode (CC or IR mode) and an HARQ scheme (adaptive HARQ or non-adaptive HARQ scheme) on coded bits according to a retransmission environment in order to retransmit an error-generated packet.

A channel interleaver distributes a transmission error according to channels by mixing coded bits in units of bits. A physical resource mapper converts the interleaved coded bits into data symbols and maps the same to subbursts in the data region.

Data retransmission of HARQ will now be described. Data retransmission of HARQ may be performed synchronously or asynchronously according to the SAW, GBN, or SR scheme. In this case, as for the retransmitted data, its transmission attributes such as resource allocation, a modulation scheme, the size of a transport block, or the like, may be adaptively changed according to a channel state.

Figure 5:
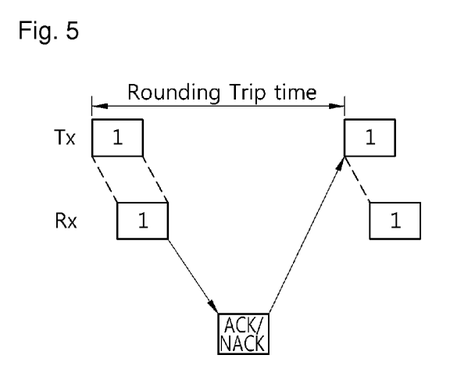
FIG. 5 shows data retransmission according to a stop and wait (SAW) scheme.

FIG. 5 shows data retransmission according to the SAW scheme.

With reference to FIG. 5, in the SAW scheme, the transmitter (Tx) transmits one frame, and then, it transmits the next frame or a retransmission frame after a rounding trip time (RTT) during which a ACK/NACK signal with respect to the transmission frame is received from the receiver (Rx). In the adaptive HARQ, when the transmitter receives the NACK signal from the receiver, it may transmit a retransmission frame by changing resource allocation, modulation scheme, the size of a transport block, or the like.

With the SAW scheme, the transmission efficiency deteriorates because transmission of data frames is delayed during the RTT.

Figure 6:
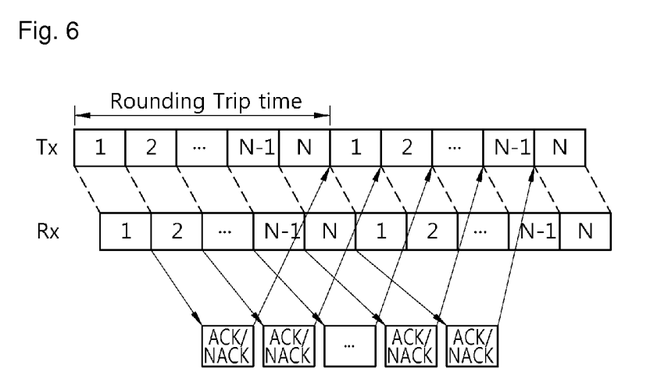
FIG. 6 shows data retransmission according to an N-channel SAW scheme.

FIG. 6 shows data retransmission according to the N-channel SAW scheme.

With reference to FIG. 6, in the N-channel SAW scheme, the transmitter (Tx) transmits one frame, and performs an independent SAW type HARQ until it receives an ACK/NACK signal from the receiver (Rx). Namely, in the N-channel SAW scheme, the transmitter transmits the N number of frames during the RTT, and the receiver transmits an ACK/NACK signal separately for each frame. In the adaptive HARQ, the transmitter may change resource allocation, the modulation scheme, the size of the transport block, or the like, with respect to a frame for which the NACK signal has been received, and transmit a retransmission frame.

The N-channel SAW scheme enhances the transmission efficiency by complementing the shortcomings of the SAW scheme in which a data frame is not transmitted during the RTT.

Figure 7:
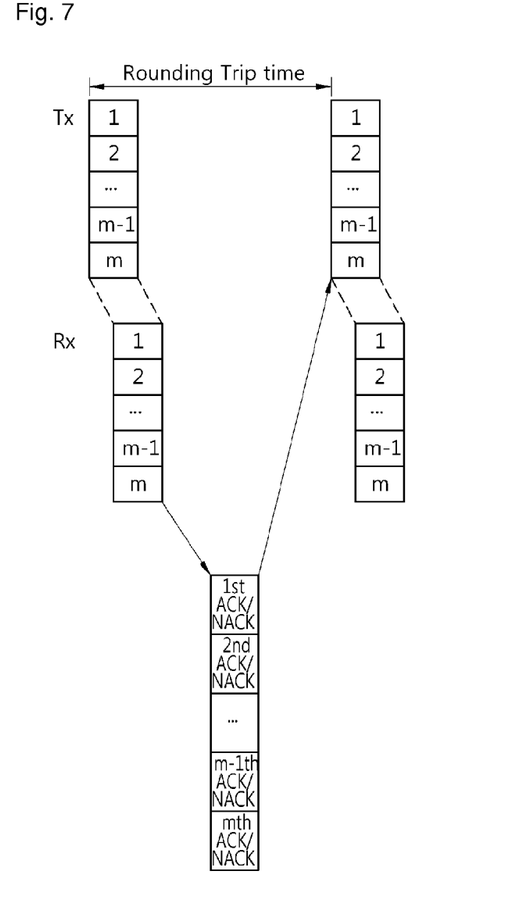
FIG. 7 shows data retransmission according to a multi-SAW scheme.

FIG. 7 shows data retransmission according to a multi-SAW scheme.

With reference to FIG. 7, if a bandwidth that can be used by a wireless communication system is wide or if a multi-antenna is in use, a plurality of HARQ processors can be performed in parallel to transmit several (the 'm' number of) transport blocks via a single frame. The receiver may respond with the 'm' number of ACK/NACK signals with respect to the 'm' number of transport blocks included in the single frame. In the adaptive HARQ, the transmitter may change resource allocation, the modulation scheme, the size of the transport blocks, or the like, with respect to a frame for which the NACK signal has been received, and transmit a retransmission frame.

The transmission efficiency of the system can be further improved by applying the N-channel SAW scheme based on the multi-SAW scheme.

The HARQ in the IR mode will now be described.

Figure 8:
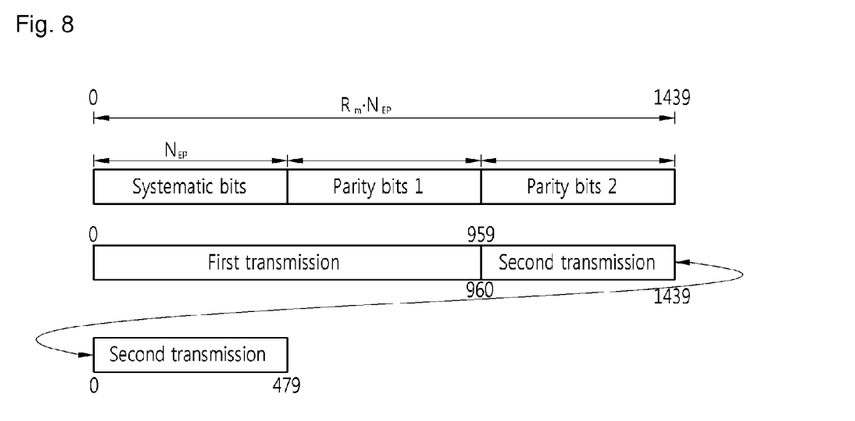
FIG. 8 shows one example of performing HARQ in an IR mode.

FIG. 8 shows one example of performing HARQ in the IR mode, in which retransmission is made in the non-adaptive HARQ scheme.

With reference to FIG. 8, in the non-adaptive HARQ scheme in the IR mode, retransmission data may be incrementally transmitted following previously transmitted data. In the non-adaptive HARQ, the retransmission data is transmitted with the same size as the first data (first transmission data). When the indexes of the retransmission data become equal to the length ($R_m \cdot N_{EP}$) of a mother codeword, the retransmission data may be transmitted circulatively. $R_m$ is an inverse number of a mother code rate $1/R_m$, and $N_{EP}$ is the size of a code block admitted in the encoder. The mother codeword may include systematic bits having the same bit stream as that of the code block and one or more parity bits, a bit stream related to the systematic bits. The mother codeword may be a turbo codeword. The length of the mother codeword is $R_m \cdot N_{EP}$.

In the IR mode, one bit stream including the systematic bits of the mother codeword is first transmitted, and another bit stream is incrementally transmitted according to a retransmission request with respect to the mother codeword. Namely, some bit streams of the mother codeword are initially transmitted and then retransmitted by blocks.

When data is transmitted with the mother code rate $1/R_m=1/3$ and the size of the code block $N_{EP}=480$ bits, 10 radio resources (subchannels0 are allocated, and when a QPSK (Quadrature Phase Shift Keying) modulation scheme is applied, the first transmitted data and retransmission data in the non-adaptive HARQ scheme can be expressed by Equation 1 shown below:

MathFigure 1

$$S_k = (F_k+1) \bmod (3N_{EP}) \quad \text{[Math.1]}$$

wherein $i=0, \ldots, L_k-1$, and $L_k = 48 \, N_{SCHk} \cdot M_k$ $F_k = (SPID_k \cdot L_k) \bmod (3N_{EP})$.

wherein 'k' is the number of retransmissions (if k=0, it indicates the first (new) transmission), $S_k$ is the kth data, $F_k$ is a start point of the kth data, 'i' is a bit of the ith index, and $L_k$ is the length of the kth data transmitted via a channel. $SPID_k$ is the version of the kth data (the first transmission is always SPID=0), which can be repeated as 0, 1, 2, 3, 0, 1, $M_k$ is a modulation order. When the modulation scheme is BPSK (Binary-Phase Shift Keying), $M_k=1$ is applied, when it is QPSK (Quadrature-Phase Shift Keying), $M_k=2$ is applied, when it is 8 PSK, $M_k=3$ is applied, when it is 16 QAM, $M_k=4$ is applied, and when it is 64 QAM, $M_k=6$ is applied.

In the non-adaptive HARQ scheme, the length ($L_k$) of the retransmission data is uniform, so the start point ($F_k$) of the retransmission data can be accurately detected. Because the transmission attributes used for the first transmission are used as it is for the retransmission according to the non-adaptive HARQ scheme, the lengths ($L_k$) of the first data and the retransmission data are uniform. In the non-adaptive HARQ scheme, the start point of the retransmission data can be accurately detected according to the number of retransmissions.

According to Equation 1, the indexes of the mother codeword are 0~1439, and in the first transmission, data of indexes of 0~959 of the mother codeword is transmitted with the SPID=0. In a second transmission, data of indexes of 960~1439 and 0·479 of the mother codeword is transmitted with the SPID=1.

In the non-adaptive HARQ scheme, the retransmission data may be transmitted such that it does not overlap with previously transmitted data, and thus, the coding gain of the IR mode can be obtained to its maximum level. In this respect, however, if the size of the retransmission data is arbitrarily changed like in the adaptive HARQ, a start point of the retransmission data cannot be determined not to overlap with the previously transmitted data, failing to obtain the coding gain of the IR mode.

Figure 9:
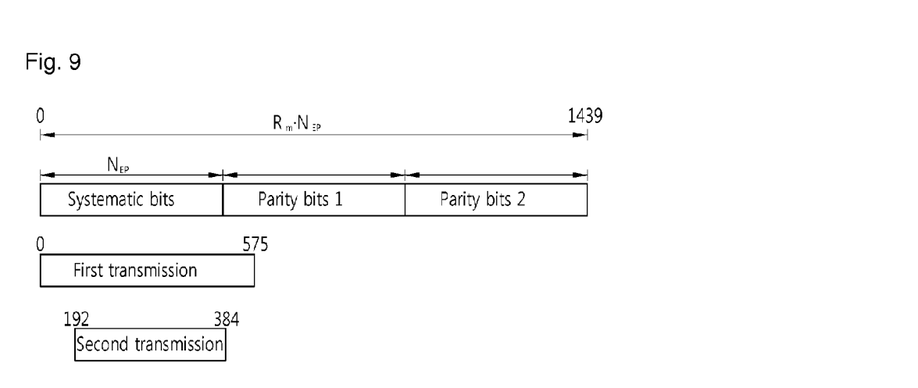
FIG. 9 shows another example of performing HARQ in the IR mode.

FIG. 9 shows another example of performing HARQ in the IR mode, in which retransmission is made according to the adaptive HARQ scheme.

With reference to FIG. 9, the transmission attributes vary in the adaptive HARQ scheme, making a start point of retransmission data changed. The retransmission data may overlap with previously transmitted data, so the coding gain of the IR mode cannot be obtained.

In Equation 1, on the assumption that a mother code rate $1/R_m$ is 1/3, the size of a code block $N_{EP}$ is 480 bits, if two subchannels are used in the first transmission according to the 64 QAM modulation scheme, data of indexes 0~575 of the mother codeword is transmitted. When one subchannel is used in the second transmission according to the 16 QAM modulation scheme, data of indexes 192~384 is transmitted. The data in the second transmission is a part of the data in the first transmission. Namely, the retransmission (second transmission) data becomes a part of the previously transmitted (first transmission) data, so the coding gain of the IR mode cannot be obtained.

Figure 10:
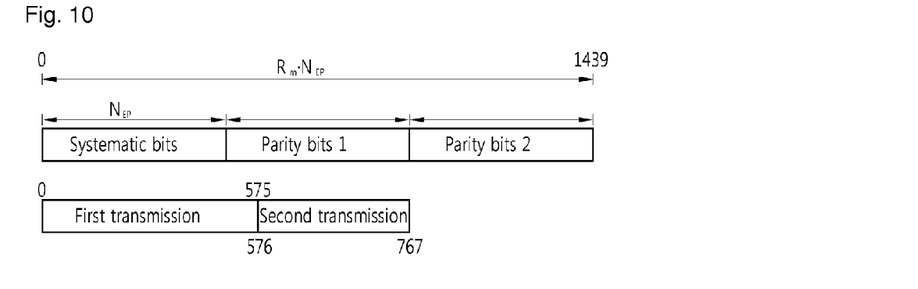
FIG. 10 shows an adaptive HARQ scheme obtaining a coding gain in the IR mode according to one embodiment of the present invention.

FIG. 10 shows an adaptive HARQ scheme obtaining a coding gain in the IR mode according to one embodiment of the present invention.

With reference to FIG. 10, a start point of retransmission data can be detected (searched) based on information about previously transmitted data in the IR mode.

Equation 2 shows the method for detecting a start point of the retransmission data by using start point and length information of the previous data in the IR mode.

MathFigure 2

$$S_k = (F_k + i) \bmod (R_m \cdot N_{EP}) \quad \text{[Math.2]}$$

$i = 0, \ldots, L_k - 1$ $L_k = N_{sub} \cdot N_{SCHk} \cdot M_k$

If (IR mode)
   If (systematic bit puncturing mode)
      $F_0 = d$
      $F_k = (F_{k-1} + L_{k-1}) \bmod (R_m \cdot N_{EP})$ (k≥1)

-continued

```
    Else
        F_0 = 0
        F_k = (F_{k-1} + L_{k-1}) mod (R_m · N_EP)  (k≥1)
    Else if (CC mode)
        If (systematic bit puncturing mode) F_k = d
    Else
        F_k = 0
End if
``` wherein 'k' is the number of retransmissions (if k=0, it indicates first (new) transmission), $S_k$ is the kth data, $F_k$ is a start point of the kth data, 'i' is a bit of the ith index, $R_m$ is an inverse number of mother code rate $1/R_m$, $N_{EP}$ is the size of a code block admitted in an encoder, $L_k$ is the length of the kth data transmitted via a channel (this length can be obtained via other variables), $N_{sub}$ is the number of symbols or subcarriers that can be carried in a subchannel, $N_{SCHk}$ is the number of subchannels, $M_k$ is a modulation order, and 'd' is the number of bits punctuated in a systematic bit puncturing mode operation. If the modulation scheme is BPSK, the modulation order $M_k=1$ is applied, if it is the QPSK, $M_k=2$ is applied, if it is the 8 PSK, $M_k=3$ is applied, if it is 16 QAM, $M_k=4$ is applied, if it is 64 QAM, $M_k=6$ is applied.

The systematic bit puncturing mode is a scheme for puncturing some of the systematic bits, and the start point ($F_0$) of the data is determined as 'd' in the first transmission. In the IR mode, the start point ($F_k$) of the retransmission data is determined by the start point ($F_{k-1}$) and length ($L_{k-1}$) of the previously transmitted data. In the CC mode, the start point of the retransmission data is determined as 'd' or '0'.

The start point of the initial data and the retransmission data can be obtained by applying Equation 2 under the following conditions.

When the mother code rate $1/R_m$ is 1/3, the size of the code block $N_{EP}$ is 480 bits, and the number of subcarriers $N_{sub}$ is 48, data is transmitted by using two subchannels ($N_{SCH0}=2$) in the first transmission (k=0) according to the 64 QAM modulation scheme ($M_0=6$) and retransmission data is transmitted by using one subchannel ($N_{SCH1}=1$) in the second transmission (k=1) according to the 16 QAM modulation scheme ($M_1=4$).

In the first transmission (k=0),
$L_0=48\times2\times6=576$
$F_0=0$
$S_0=(0+i)\mod(3\cdot480)\rightarrow$Data (first block) of indexes (0, 1, . . . , 575) of the mother codeword is transmitted.

In the second transmission (k=1),
L1=48×1×4=192
L0=576
F1=(0+576)mod(3·480)=576
$S_1=(576+i)\mod(3\cdot480)\rightarrow$Data (second block) of indexes (576, 577, . . . , 767) of the mother codeword is transmitted.

Because the second transmission data is successively transmitted after the first transmission data, the coding gain of the IR mode can be obtained.

The start point of the retransmission data can be detected by using information about the last point of the previously transmitted data. Equation 3 shows a method for detecting the start point of the retransmission data by using the information about the last point of the previous data in the IR mode.

MathFigure 3

$$S_k=(F_k+i)\mod(R_m \cdot N_{EP}) \quad [\text{Math.3}]$$

$i=0,\ldots,L_k-1$ $L_k=N_{sub}\cdot N_{SCHk}\cdot M_k$ $E_k=(F_k+L_k)\mod(R_m\cdot N_{EP})$

```
    If (IR mode)
        If (systematic bit puncturing mode)
            F_0 = d
            F_k = (E_{k-1})  (where, k≥1)
        Else
            F_0 = 0
            F_k = (E_{k-1})  (where, k≥1)
    Else if (CC mode)
        If (systematic bit puncturing mode)
            F_k = d
        Else
            F_k = 0
End if
```

$E_k$ is the last point of the kth data. In the IR mode, the start point ($F_k$) of the retransmission data is determined by the last point ($E_k-1$) of the previously transmitted data.

The start point of the first data and the retransmission data can be obtained by applying Equation 3 under the following conditions.

When the mother code rate $1/R_m$ is 1/3, the size of the code block $N_{EP}$ is 480 bits, and the number of subcarriers $N_{sub}$ is 48, data is transmitted by using two subchannels ($N_{SCH0}=2$) in the first transmission (k=0) according to the 64 QAM modulation scheme ($M_0=6$) and retransmission data is transmitted by using one subchannel ($N_{SCH1}=1$) in the second transmission (k=1) according to the 16 QAM modulation scheme ($M_1=4$).

In the first transmission (k=0),
$L_0=48\times2\times6=576$
$E_0=576$
$F_o=0$
$S_0=(0+i)\mod(3\cdot480)\rightarrow$Data (first block) of indexes (0, 1, . . . , 575) of the mother codeword is transmitted.

In the second transmission (k=1),
$L_1=48\times1\times4=192$
$E_0=576$
$F_1=E_0=576$
$S_1=(576+i)\mod(3\cdot480)\rightarrow$Data of indexes (576, 577, . . . , 767) of the mother codeword is transmitted.

Likewise as in Equation 2, the second transmission data is successively transmitted after the first transmission data, so the coding gain of the IR mode can be obtained.

Figure 11:
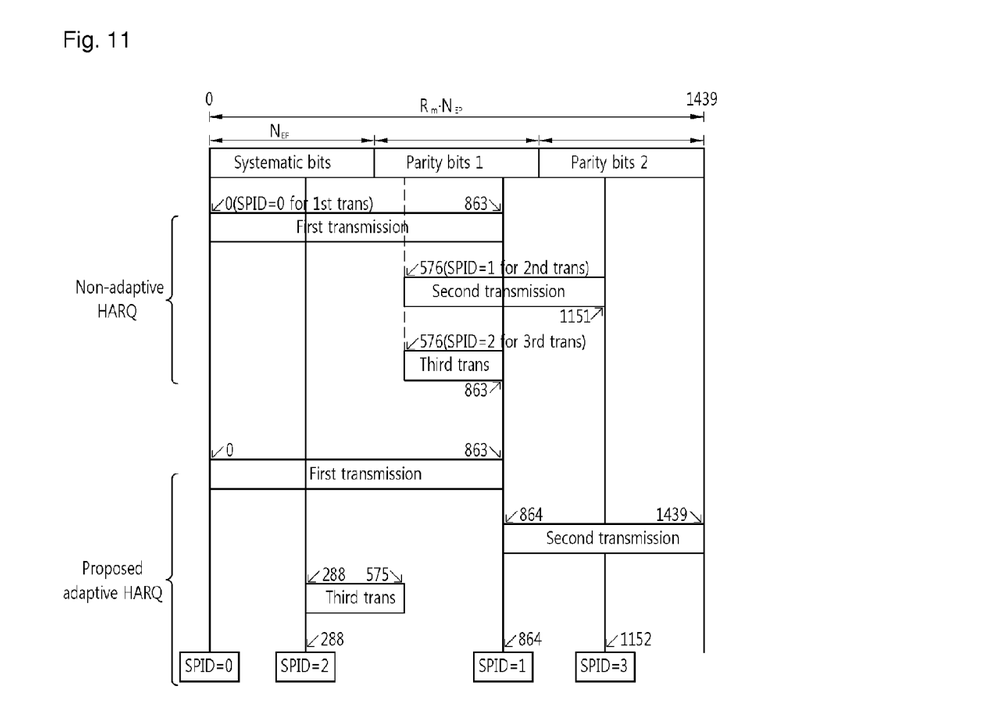
FIG. 11 shows an adaptive HARQ scheme obtaining a coding gain in the IR mode according to another embodiment of the present invention.

FIG. 11 illustrates the adaptive HARQ scheme obtaining the coding gain in the IR mode according to another embodiment of the present invention.

With reference to FIG. 11, the start point of the retransmission data can be determined based on the length of the initial transmission data.

Equation 4 shows a method for detecting the start point of the retransmission data with a multiple of the length of the initially transmitted (first transmission) data in the IR mode.

MathFigure 4

$$S_k=(F_k+i)\mod(R_m\cdot N_{EP}) \quad [\text{Math.4}]$$

$i=0,\ldots,L_k-1$ $L_k=N_{sub}\cdot N_{SCHk}\cdot M_k$ $L_f=N_{sub}\cdot N_{SCH0}\cdot M_0$ If (systematic bit puncturing mode)
    $F_k = (SPID_k \cdot L_f + d) \bmod (R_m \cdot N_{EP})$, (When k=0, SPID is always 0)
else
    $F_k = (SPID_k \cdot L_f) \bmod (R_m \cdot N_{EP})$, (When k=0, SPID is always 0)
End if $L_f$ is the length of the initially transmitted data, and $SPID_k$ is repeated as 0, 1, 2, 3, 0, 1, . . . with the version of the kth data (the first transmission is always SPID=0). The start point of the retransmission data is determined by a multiple $(SPID_k \cdot L_f)$ of the length of the initially transmitted data.

The start points of the first data and the retransmission data can be obtained by applying Equation 4 under the following conditions.

When the mother code rate $1/R_m$ is 1/3, the size of the code block $N_{EP}$ is 480 bits, and the number of subcarriers $N_{sub}$ is 48, data is transmitted by using three subchannels ($N_{SCH0}$=3) in the first transmission (k=0) according to the 64 QAM modulation scheme ($M_0$=6), retransmission data is transmitted by using three subchannel ($N_{SCH1}$=3) in the second transmission (k=1) according to the 16 QAM modulation scheme ($M_1$=4), and retransmission data is transmitted by using three subchannels ($N_{SCH2}$=3) in a third transmission (k=2) according to the QPSK modulation scheme ($M_2$=2).

In the first transmission (k=0),
$L_f$=48×3×6=864
$F_0$=0
$S_0$=(0+i)mod(3·80)→Data (first block) of indexes (0, 1, . . . , 863) of the mother codeword is transmitted.
In the second transmission (k=1),
$L_1$=48×3×4=576
$F_1$=1·864 mod(3·480)=864
$S_1$=(864+i)mod(3·480)→Data (second block) of indexes (864, 865, . . . , 1439) of the mother codeword is transmitted.
In the third transmission (k=2),
$L_2$=48×3×2=288
$F_2$=2×864 mod(3·480)=288
$S_2$=(288+i)mod(3·480)→Data (third block) of indexes (288, 289, . . . , 575) of the mother codeword is transmitted.

In the method for detecting the start point of the retransmission data with the multiple of the initially transmitted (first transmission) data in the adaptive HARQ, because the second transmission data is successively transmitted after the first transmission data, the coding gain of the IR mode can be obtained.

The first to third transmissions can be obtained by using Equation 1 of the non-adaptive HARQ scheme under the above-mentioned conditions:
In the first transmission (k=0),
$F_0$=0
$S_0$=(0+i)mod(3·480)→Data (first block) of indexes (0, 1, . . . , 863) of the mother codeword is transmitted.
In the second transmission (k=1),
$F_1$=(1·576)mod(3·480)=576
$S_1$=(576+i)mod(3·480)→Data (second block) of indexes (576, 577, . . . , 1151) of the mother codeword is transmitted.
In the third transmission (k=2),
$F_2$=(2·88)mod(3·480)=576
$S_2$=(576+i)mod(3·480)→Data (third block) of indexes (576, 577, . . . , 863) of the mother codeword is transmitted.

In the non-adaptive HARQ scheme, many portions of the first data and the retransmission data overlap, so a sufficient coding gain of the IR mode cannot be obtained, but comparatively, in the proposed adaptive HARQ scheme, the overlap portions between the first data and the retransmission data are reduced to obtain a sufficient coding gain of the IR mode.

Figure 12:
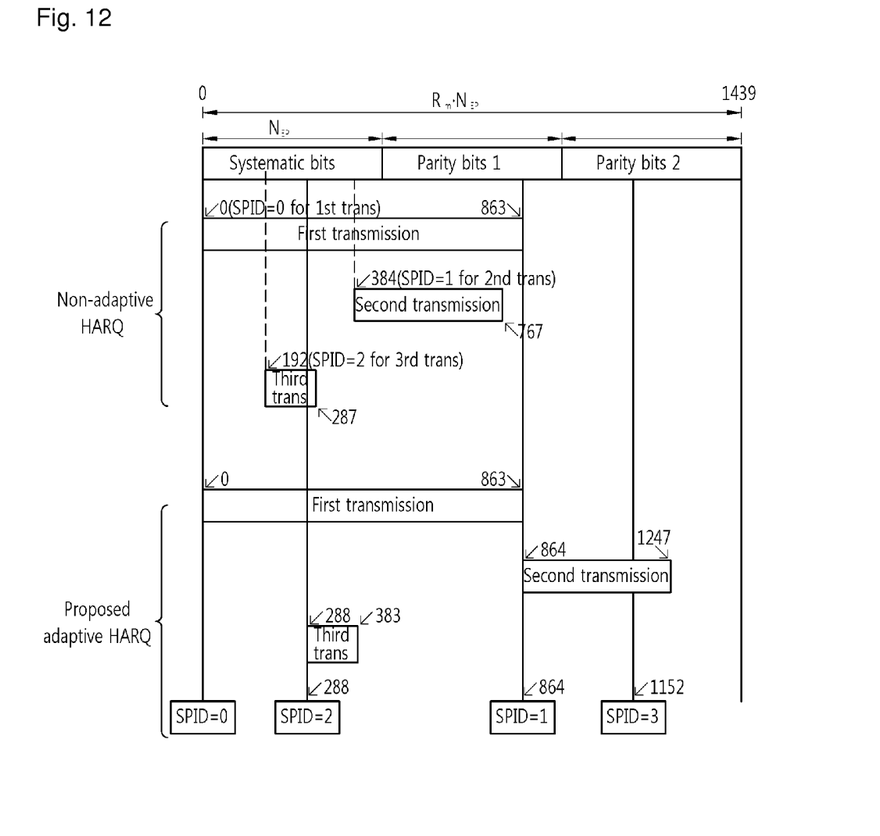
FIG. 12 shows an adaptive HARQ scheme obtaining a coding gain in the IR mode according to still another embodiment of the present invention.

FIG. 12 illustrates the adaptive HARQ scheme obtaining the coding gain in the IR mode according to still another embodiment of the present invention.

With reference to FIG. 12, first data and retransmission data are obtained by applying the following conditions to Equation 1 according to the non-adaptive HARQ scheme and Equation 4 according to the proposed adaptive HARQ scheme.

When the mother code rate $1/R_m$ is 1/3, the size of the code block $N_{EP}$ is 480 bits, and the number of subcarriers $N_{sub}$ is 48, data is transmitted by using three subchannels ($N_{SCH0}$=3) in the first transmission (k=0) according to the 64 QAM modulation scheme ($M_0$=6), retransmission data is transmitted by using two subchannel ($N_{SCH1}$=2) in the second transmission (k=1) according to the 16 QAM modulation scheme ($M_1$=4), and retransmission data is transmitted by using one subchannel ($N_{SCH2}$=1) in a third transmission (k=2) according to the QPSK modulation scheme ($M_2$=2).

In case of Equation 4 according to the proposed adaptive HARQ scheme,
In the first transmission (k=0),
$L_f$=48×3×6=864
$F_0$=0
$S_0$=(0+i)mod(3·480)→Data (first block) of indexes (0, 1, . . . , 863) of the mother codeword is transmitted.
In the second transmission (k=1),
$L_1$=48×2×4=384
$F_1$=1×864 mod(3·480)=864
$S_1$=(864+i)mod(3·480)→Data (second block) of indexes (864, 865, . . . , 1247) of the mother codeword is transmitted.
In the third transmission (k=2),
$L_2$=48×1×2=96
$F_2$=2·864 mod(3·480)=288
$S_2$=(288+i)mod(3·480)→Data (third block) of indexes (288, 289, . . . , 383) of the mother codeword is transmitted.

Meanwhile, in case of Equation 1 according to the non-adaptive HARQ scheme),
In the first transmission (k=0),
$L_0$=48×3×6=864
$F_0$=0
$S_0$=(0+i)mod(3·480)→Data (first block) of indexes (0, 1, . . . , 863) of the mother codeword is transmitted.
In the second transmission (k=1),
$L_1$=48×2×4=384
$F_1$=(1·384)mod(3·480)=384
$S_1$=(384+i)mod(3·480)→Data (second block) of indexes (384, 385, . . . , 767) of the mother codeword is transmitted.
In the third transmission (k=2),
$L_2$=48×1×2=96
$F_2$=(2·96)mod(3·480)=192
$S_2$=(192+i)mod(3·480)→Data (third block) of indexes of (192, 193, . . . , 287) of the mother codeword is transmitted.

In the non-adaptive HARQ scheme, because all the first to third transmission data overlap, the coding gain of the IR mode cannot be obtained. Comparatively, however, in the proposed adaptive HARQ scheme, the first and second transmission data do not overlap, so the coding gain of the IR mode can be obtained.

Every function as described above can be performed by a processor such as a microprocessor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. A method of transmitting data using an adaptive hybrid automatic repeat request (HARQ) scheme, the method comprising:

configuring a mother codeword generated based on a turbo coder which outputs two groups of parity bits including first parity bits and second parity bits, wherein the mother codeword includes systematic bits directly followed by the first parity bits directly followed by the second parity bits;

configuring a first block, which is a partial bit stream of the mother codeword, wherein a start point of the first block is fixed at a start point of the mother codeword, wherein a first modulation scheme with a first modulation order is applied to the first block, wherein the first block includes the systematic bits and a portion of the first parity bits;

transmitting the first block; and configuring a second block according to a retransmission request with respect to the first block, wherein the second block directly follows the first block in the mother codeword so that the second block does not overlap with the first block, wherein the second block includes a remaining portion of the first parity bits and a portion of the second parity bits, wherein a second modulation scheme with a second modulation order is applied to the second block, wherein the first modulation order is higher than the second modulation order.

2. The method of claim 1, wherein a code rate of the turbo coder is 1/3.

3. The method of claim 1, further comprising:

configuring a third block according to a retransmission request with respect to the second block, wherein a start point of the third block is determined based on a retransmission version of the third block and a length of the third block so that the third block does not overlap with second block, wherein a third modulation scheme with a third modulation order is applied to the third block, wherein the second modulation order is higher than the third modulation order.

* * * * *